(12) United States Patent
Chang

(10) Patent No.: US 10,577,098 B2
(45) Date of Patent: Mar. 3, 2020

(54) DRONE HAVING RECONFIGURABLE SHAPE

(71) Applicant: KOREA AEROSPACE RESEARCH INSTITUTE, Daejeon (KR)

(72) Inventor: Sungho Chang, Sejong (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 497 days.

(21) Appl. No.: 15/503,252

(22) PCT Filed: Dec. 30, 2014

(86) PCT No.: PCT/KR2014/013032
§ 371 (c)(1),
(2) Date: Feb. 10, 2017

(87) PCT Pub. No.: WO2016/027942
PCT Pub. Date: Feb. 25, 2016

(65) Prior Publication Data
US 2017/0233072 A1      Aug. 17, 2017

(30) Foreign Application Priority Data

Aug. 22, 2014   (KR) .................. 10-2014-0109436

(51) Int. Cl.
*B64C 39/00*      (2006.01)
*B64C 39/02*      (2006.01)
*B64C 37/02*      (2006.01)
*B64D 47/08*      (2006.01)

(52) U.S. Cl.
CPC ............ *B64C 39/024* (2013.01); *B64C 37/02* (2013.01); *B64D 47/08* (2013.01); *B64C 2201/027* (2013.01); *B64C 2201/108* (2013.01); *B64C 2201/127* (2013.01); *B64C 2201/128* (2013.01)

(58) Field of Classification Search
CPC ............................ B64C 37/02; B64C 2211/00
See application file for complete search history.

(56) References Cited

U.S. PATENT DOCUMENTS

| 6,926,235 B2 | 8/2005 | Ouellette et al. |
| 8,473,123 B2 | 6/2013 | Sun et al. |
| 9,457,899 B2 * | 10/2016 | Duffy ..................... B64C 37/02 |
| 2005/0029400 A1 | 2/2005 | Ouellette et al. |
| 2007/0023581 A1 | 2/2007 | La |
| 2009/0194634 A1 | 8/2009 | Stelte |
| 2012/0056040 A1 | 3/2012 | Brotherton-Ratcliffe et al. |
| 2012/0061508 A1 | 3/2012 | de Viry et al. |

(Continued)

OTHER PUBLICATIONS

International Search Report for corresponding International PCT Application No. PCT/KR2014/013032, dated May 19, 2015.

*Primary Examiner* — Philip J Bonzell
*Assistant Examiner* — Michael B. Kreiner
(74) *Attorney, Agent, or Firm* — Hauptman Ham, LLP

(57) ABSTRACT

Provided is a drone having a reconfigurable shape, more specifically, a drone having a reconfigurable shape that is capable of being horizontally flown without a rotation motion of the drone by configuring unit module drones having a rectangular parallelepiped shape that may apply thrusts in six directions and is capable of being flown singly or flown in various shapes by forming an assembly drone by coupling between the unit module drones.

19 Claims, 10 Drawing Sheets

(56) References Cited

U.S. PATENT DOCUMENTS

| | | | |
|---|---|---|---|
| 2012/0158215 A1* | 6/2012 | Sun | B64C 27/20 |
| | | | 701/3 |
| 2016/0378108 A1* | 12/2016 | Paczan | B64C 37/02 |
| | | | 705/330 |
| 2017/0313418 A1* | 11/2017 | Yoon | B64C 27/08 |
| 2018/0194463 A1* | 7/2018 | Hasinski | B64C 39/024 |

* cited by examiner

[FIG. 1]
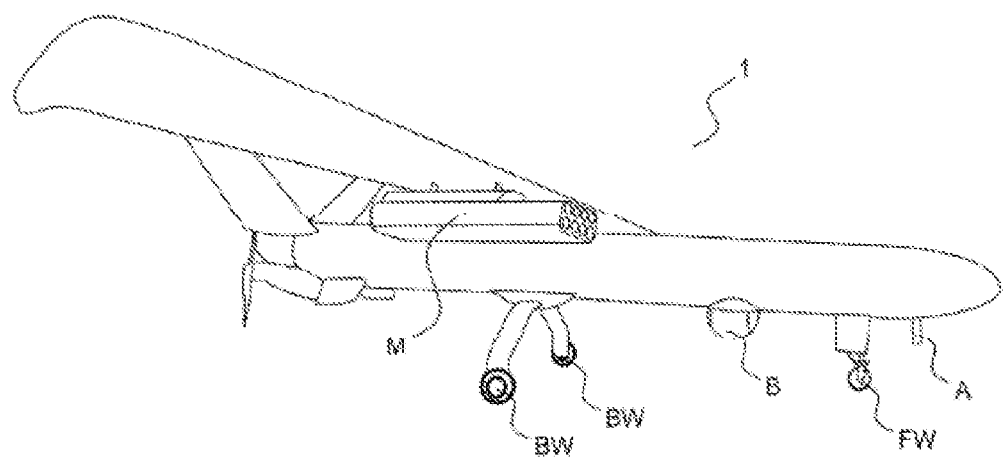

[FIG. 2]
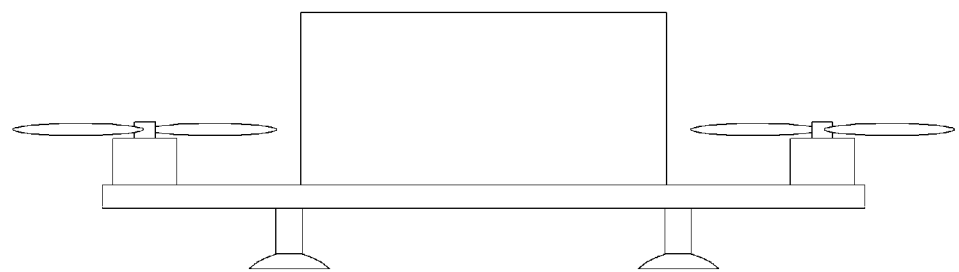
(a)
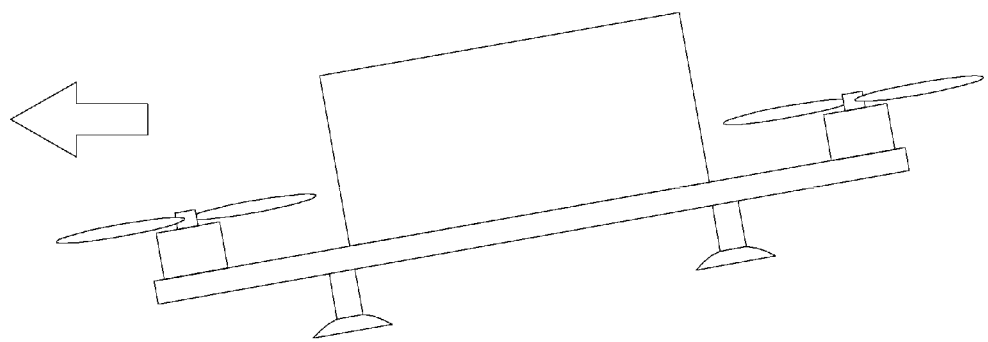
(b)

[FIG. 3]
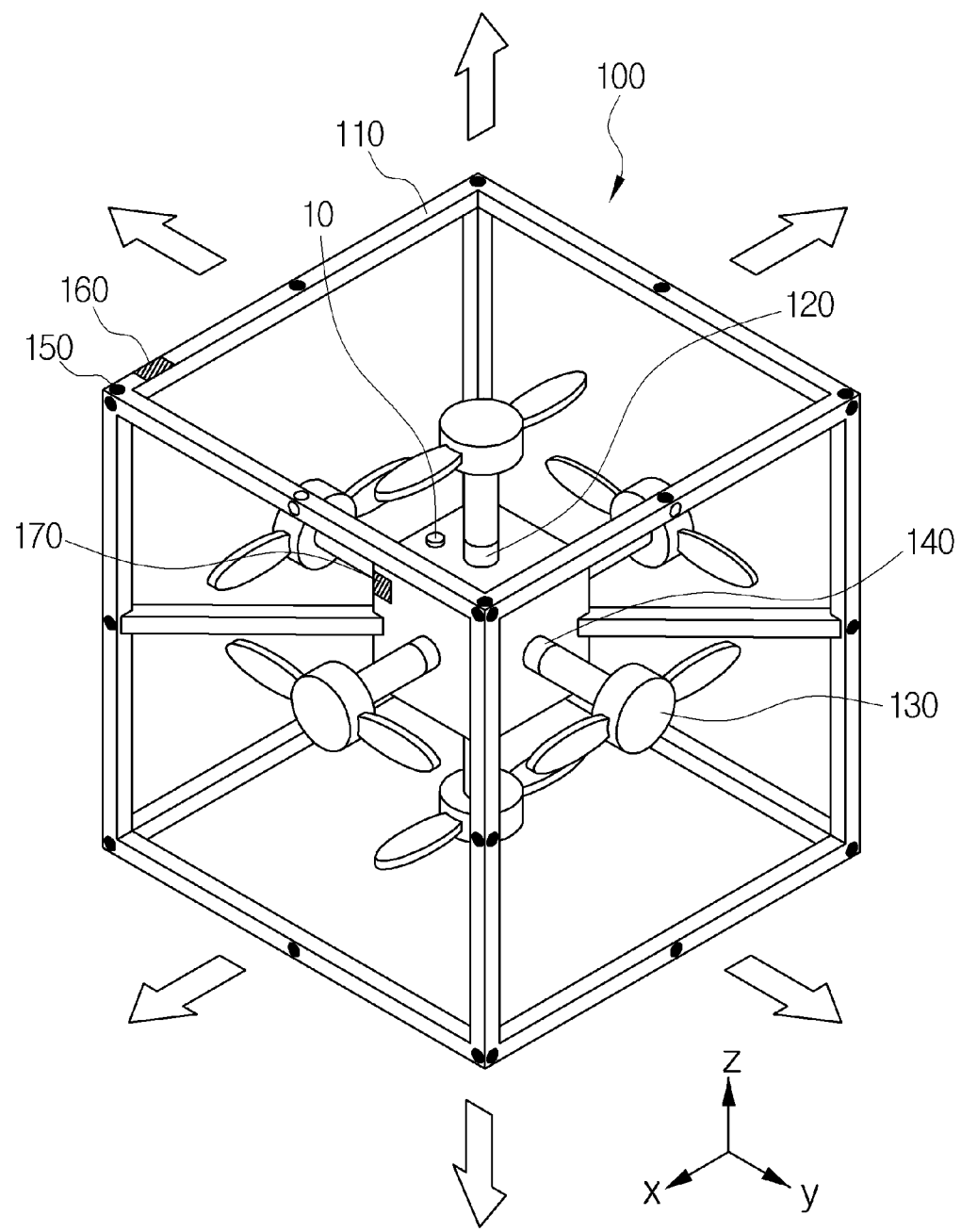

[FIG. 4]
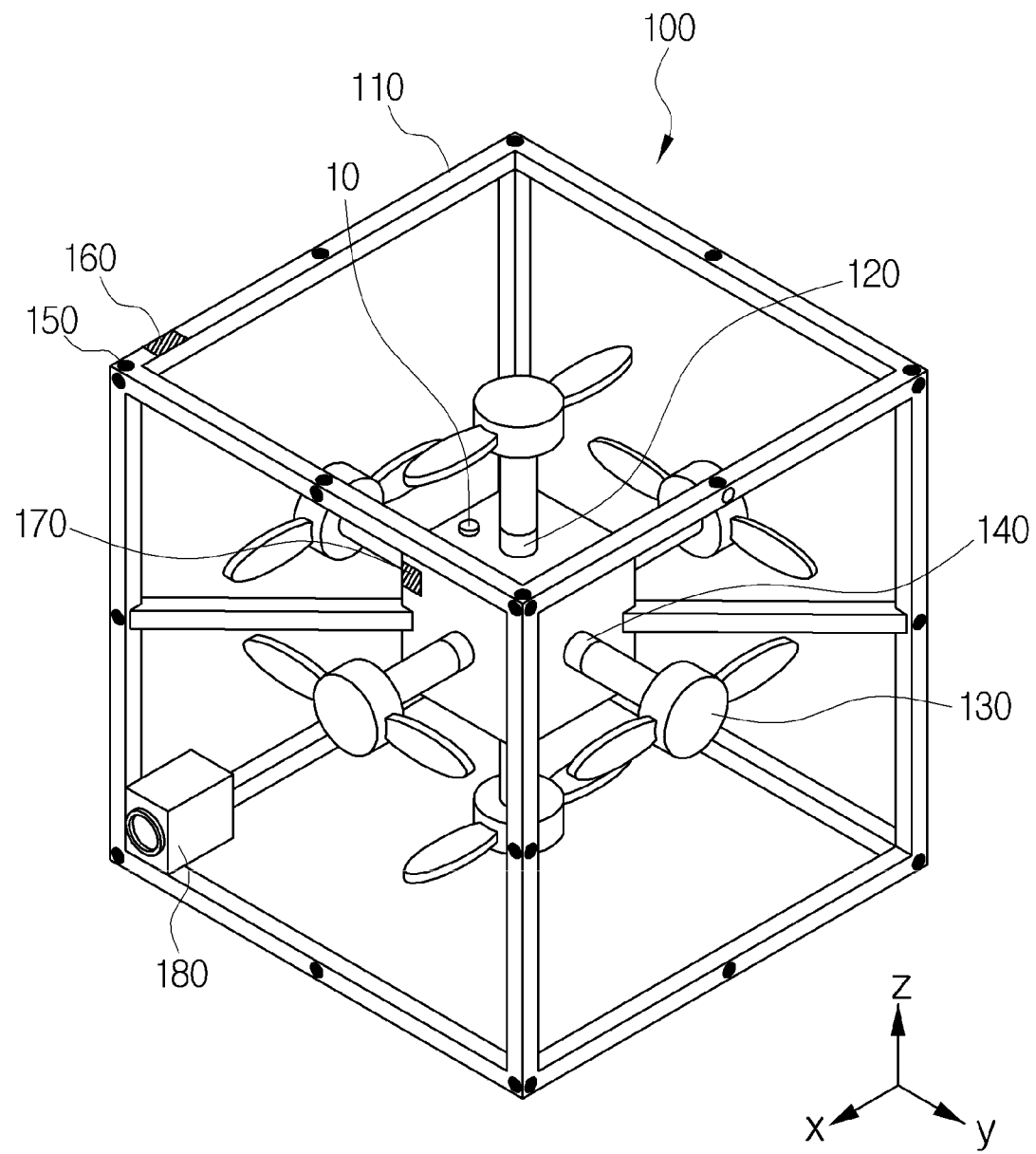

[FIG. 5]
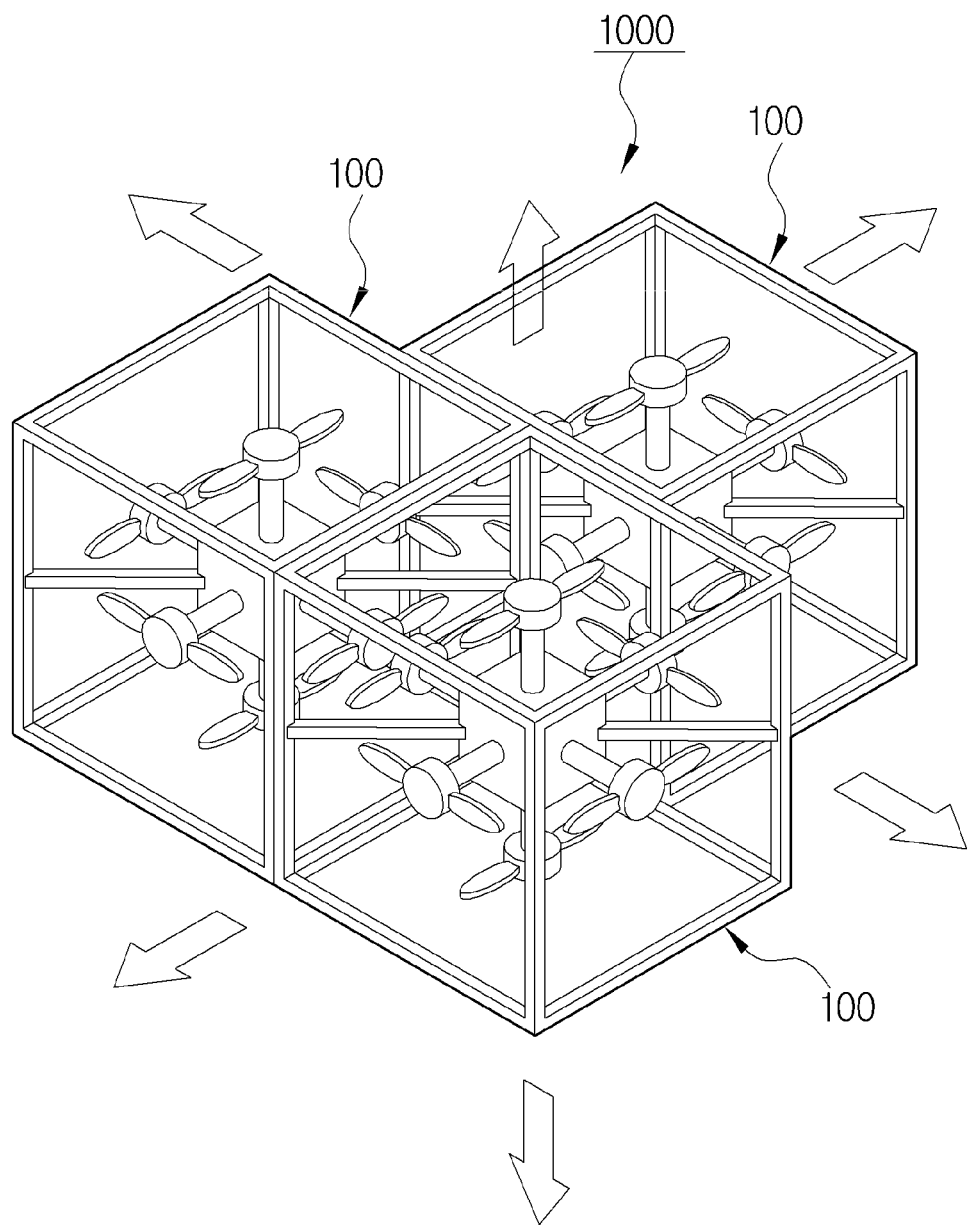

[FIG. 6]
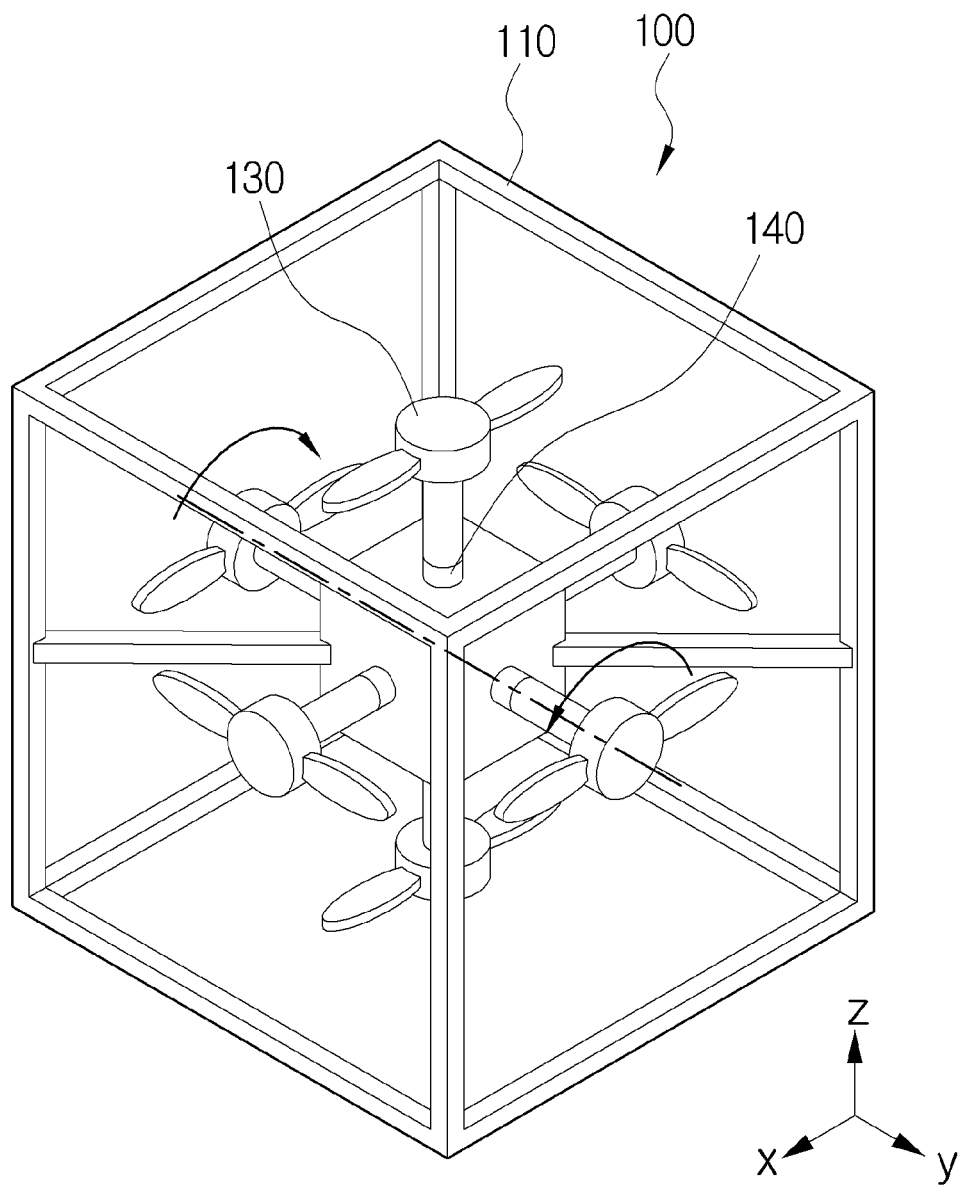

[FIG. 7]
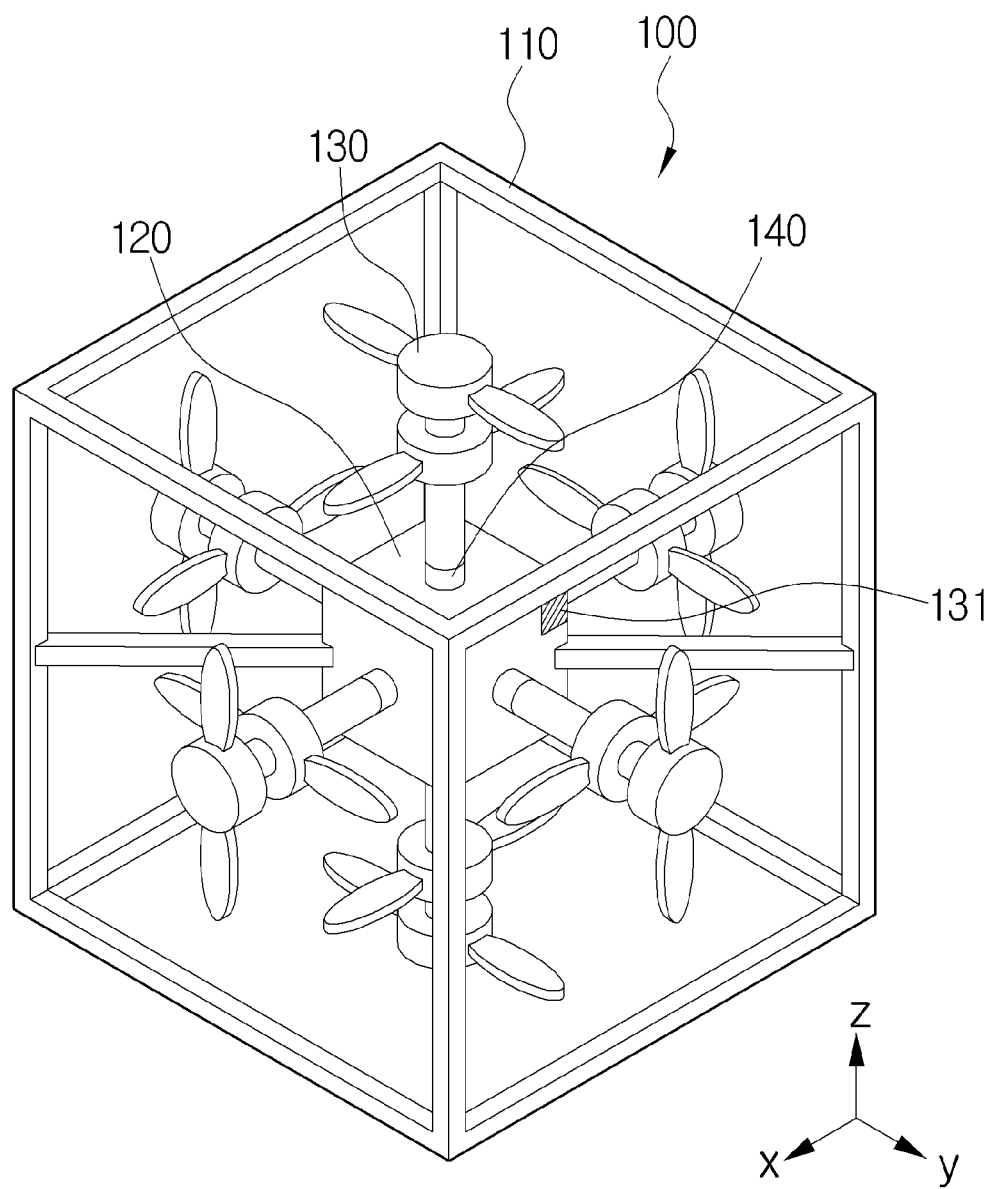

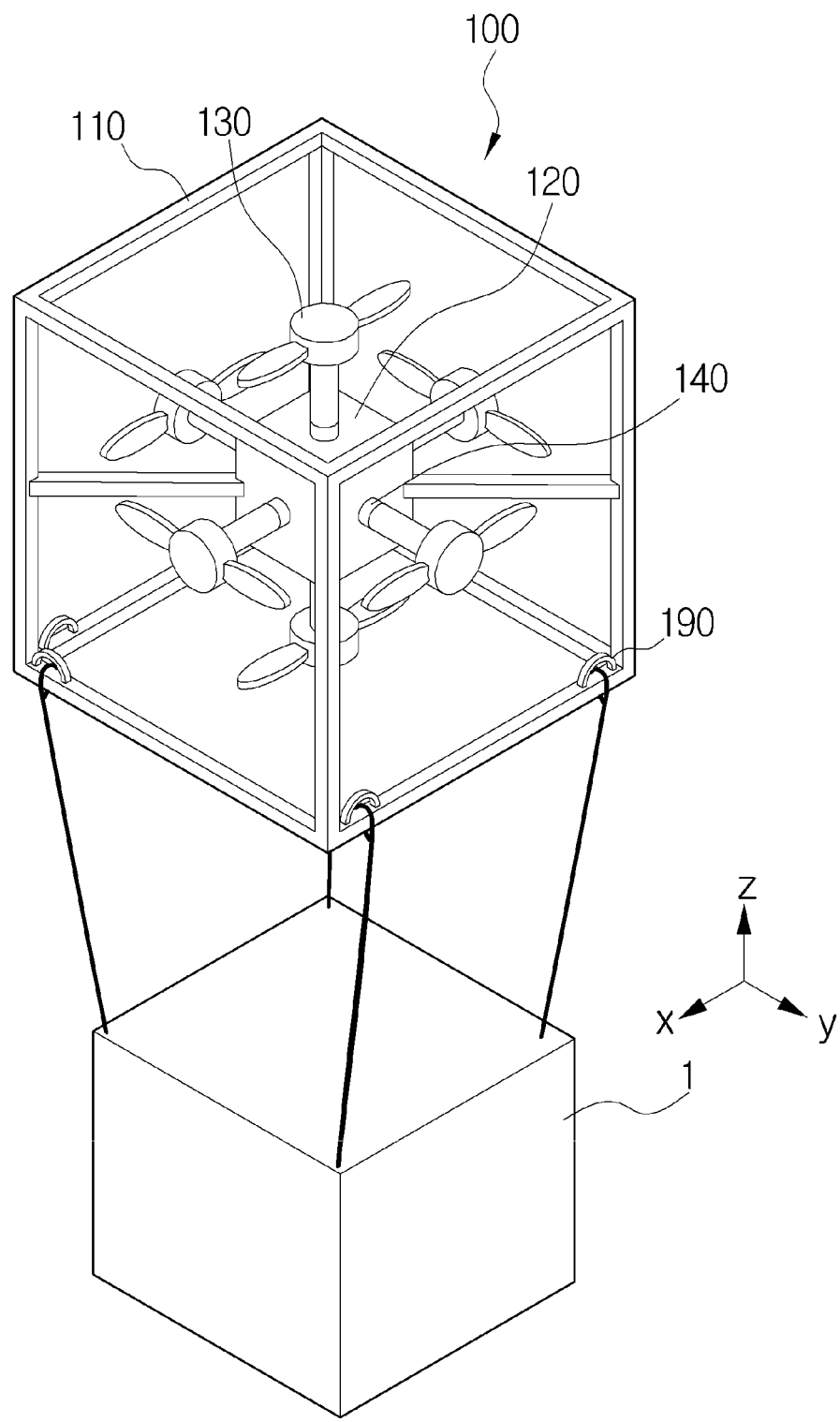
[FIG. 8]

[FIG. 9]
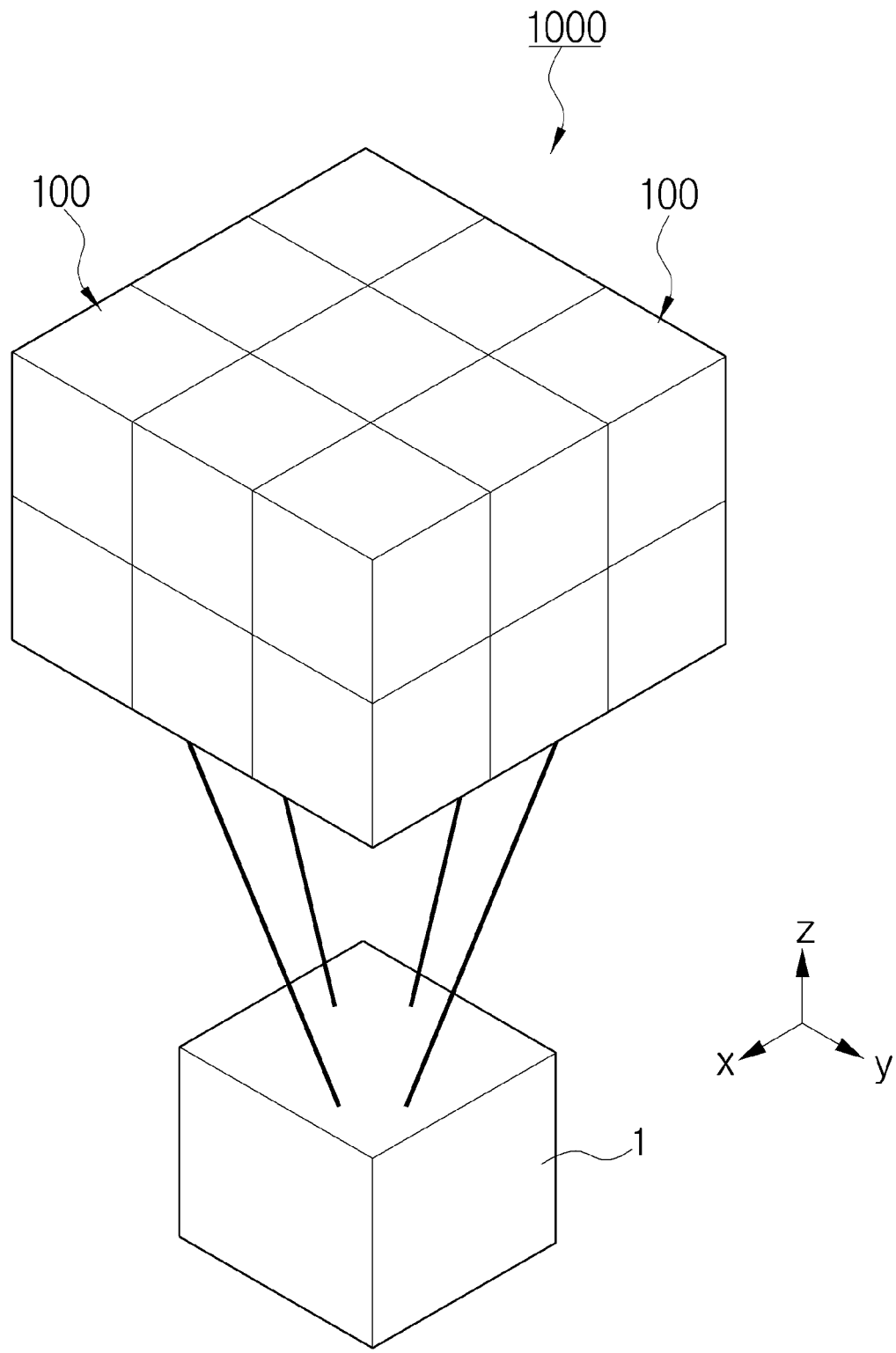

[FIG. 10]
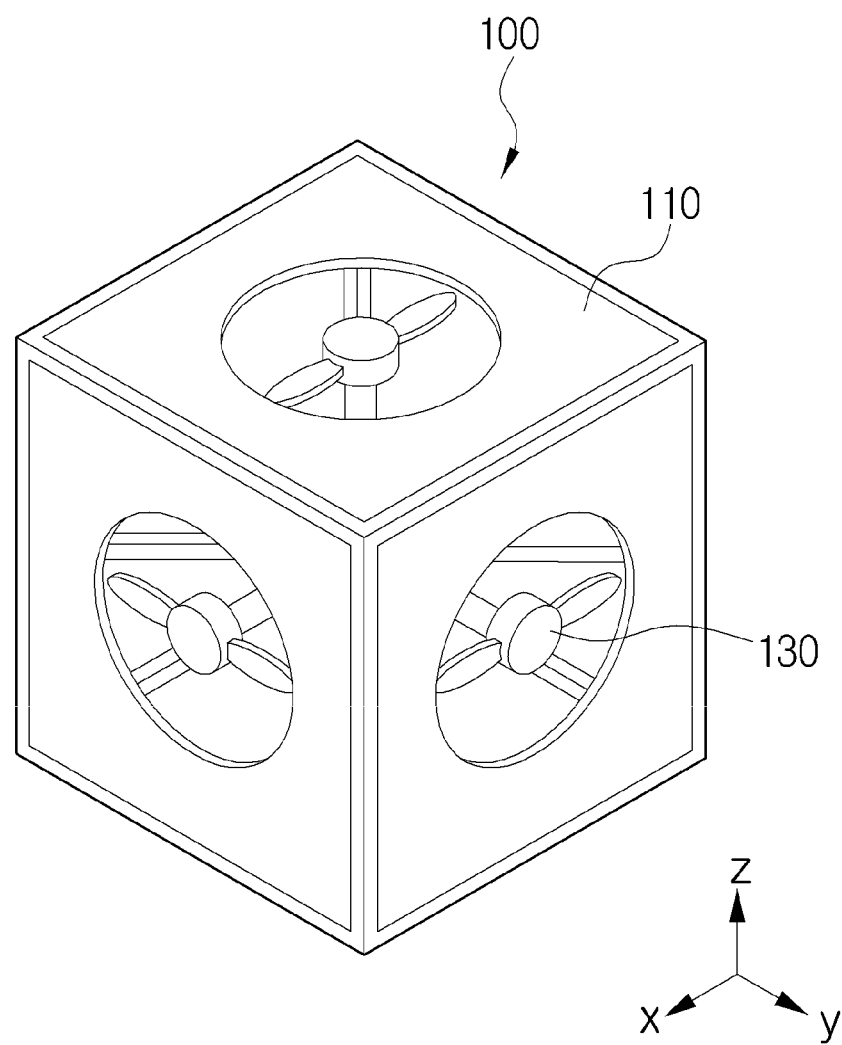

DRONE HAVING RECONFIGURABLE SHAPE

TECHNICAL FIELD

The present invention relates to a drone having a reconfigurable shape, and more particularly, to a drone having a reconfigurable shape that is capable of being horizontally flown without a rotation motion of the drone by configuring unit module drones having a rectangular parallelepiped shape that may apply thrusts in six directions and is capable of being flown singly or flown in various shapes by forming an assembly drone by coupling between the unit module drones.

BACKGROUND ART

A drone began in a military industry indicates a plane or a helicopter shaped aircraft flown by induction of a radio wave without having a person riding therein. Recently, the drone has been widely used militarily and commercially, and research into the drone has been actively conducted.

Particularly, a drone having excellent sensing capability and rapid mobility using a camera, a sensor, and the like, has been utilized in several fields such as a transportation field, a security field, a monitoring field, an observing field, and the like.

As an example, American shopping mall enterprises have planned to build-up a physical distribution delivery system using the drone, and a promotion for the physical distribution delivery system has been made.

The drone is formed in various types depending on a use purpose, such as a fixed wing type, a rotating wing type, a complex type, and the like.

The fixed wing type drone, which is a drone flown using a lift generated in a fixed wing like a general airplane, has been suggested in U.S. Patent Application Publication No. 2012-0061508 (published on Mar. 15, 2012 and entitled "Device for Firing Weapons from an Armed Drone") and is shown in FIG. 1.

The rotating wing type drone is flown using force generated in a rotating wing, as shown in FIGS. 2A and 2B, and the complex type drone indicates a tilt-rotor drone, or the like, using principles of the fixed wing and the rotating wing.

However, the drones shown in FIGS. 1 to 2B and a general drone have a problem that they move in a state in which a portion of a body thereof is inclined in the case of increasing a speed in order to move in a direction in which they are to progress through a control of a propulsion device at the time of changing a direction during being flown.

That is, the general drone performs motions such as rolling, pitching, yawing, and the like, inclining a direction of the body toward a destination, which causes a risk that a cargo mounted in the body of the drone will be inclined to thereby be damaged or lost and a situation in which a flight control is impossible due to a change in the center of gravity of the drone.

In addition, in the drone according to the related art, a drone having a propellant that may be flown while enduring weights of a load mounted in the drone and a cargo to be transported should be separately formed.

That is, in the drone according to the related art, various kinds and types of drones are formed depending on a use purpose and the weight of the cargo to be transported. Therefore, there is a limitation in a use range of the drone, such that efficiency is decreased in terms of utilization of the drone.

RELATED ART DOCUMENT

Patent Document

U.S. Patent Application Publication No. 2012-0061508 (published on Mar. 15, 2012 and entitled "Device for Firing Weapons from an Armed Drone")

DISCLOSURE

Technical Problem

An object of the present invention is to provide a drone having a reconfigurable shape in which unit module drones formed of a frame and having a rectangular parallelepiped shape are formed and propelling parts formed in six directions and generating thrusts in each of the six directions are formed, such that horizontal movement in the six directions is possible to allow rotation motions such as rolling, pitching, yawing, and the like, due to movement of the drone not to be generated, thereby making it possible to suppress a phenomenon that a weight of a load or a cargo is biased toward one side.

Particularly, an object of the present invention is to provide a drone having a reconfigurable shape in which unit module drones formed of a frame and having a rectangular parallelepiped shape are formed and propelling parts formed in six directions and generating thrusts in each of the six directions are formed, such that horizontal movement in the six directions is possible to allow the unit module drone to be operable singly and allow an assembly drone in which a plurality of unit module drones are coupled to each other to be horizontally movable in the six directions.

Technical Solution

In one general aspect, a drone having a reconfigurable shape includes: unit module drones each including: a body formed of a frame and having a rectangular parallelepiped shape; a controlling part formed at one side of an inner portion of the body and controlling a flight; propelling parts connected to the controlling part, formed in six directions, and generating thrusts in each of the six directions; power parts formed at one side of the controlling part and supplying power to the propelling parts through a control of the controlling part; and coupling parts formed on outer side surfaces of the bodies in order to couple between the bodies, wherein the drone is configurable as an assembly drone having a shape in which the unit module drones are coupled to each other by the coupling parts.

The unit module drone may include a direction axis setting part setting a direction axis using a ground contact sensor formed at one side of the body.

The unit module drone may include a body direction setting part setting a position direction of the body using an inertial sensor formed at the other side of the body.

The unit module drone may further include communicating parts formed in any one or more of the body, the controlling part, and the coupling part and formed for electrical communication between the unit module drones.

The propelling parts may use a propeller scheme.

In the propelling parts, propeller pitches of a pair of propelling parts having the same axis may be opposite to each other.

The propelling parts may be a contra-rotating propeller.

The propelling parts may include a thrust vector control device.

The unit module drone may further include a cargo connected part disposed at one side of the frame and connected to a cargo.

The unit module drone may further include photographing parts disposed at the body and including a camera for photographing.

The body may be formed in a duct shape.

Advantageous Effects

In the drone having a reconfigurable shape according to an exemplary embodiment of the present invention, the body formed of the frame and having the rectangular parallelepiped shape is formed and the propelling parts formed in the six directions and generating the thrusts in each of the six directions are formed, such that horizontal movement in the six directions is possible to allow rotation motions such as rolling, pitching, yawing, and the like, due to movement of the drone not to be generated, thereby making it possible to suppress a phenomenon that a weight of a load or a cargo is biased toward one side.

Particularly, since the drone having a reconfigurable shape according to an exemplary embodiment of the present invention may horizontally move in the six directions, the rotation motions such as the rolling, the pitching, the yawing, and the like, due to the movement of the drone are not generated, thereby making it possible to suppress a situation in which a control of the drone is impossible due to the rotation motions.

In addition, since the drone having a reconfigurable shape according to an exemplary embodiment of the present invention may horizontally move in the six directions, the drone may accurately arrive to a position at which it is to move.

Further, since the drone having a reconfigurable shape according to an exemplary embodiment of the present invention may horizontally move in the six directions, the unit module drone configured singly may be operable so as to horizontally move singly, and the assembly drone having a shape in which a plurality of unit module drones are coupled may be operable so as to horizontally move in the six directions, thereby making it possible to allow a user to simply implement drones having shapes desired by him/her in various shapes.

Furthermore, since the drone having a reconfigurable shape according to an exemplary embodiment of the present invention may freely configure a shape, a worker may configure a drone having a shape desired by him/her or capable of enduring a weight of a cargo, thereby making it possible to freely configure shapes of the drones depending a purpose or a size of a cargo that is to be moved.

Moreover, in the drone having a reconfigurable shape according to an exemplary embodiment of the present invention, since only unit module drone may be configured singly or the unit module drones may be configured so as to be coupled to each other, the unit module drones may be mass-produced, such that economical efficiency is high.

DESCRIPTION OF DRAWINGS

FIG. 1 is a view showing a general drone according to the related art.

FIGS. 2A and 2B are views showing rotation motion of the general drone according to the related art.

FIG. 3 is a view showing a unit module drone of a drone having a reconfigurable shape according to an exemplary embodiment of the present invention.

FIG. 4 is another view showing a unit module drone of a drone having a reconfigurable shape according to an exemplary embodiment of the present invention.

FIG. 5 is a view showing an assembly drone of the drone having a reconfigurable shape according to an exemplary embodiment of the present invention.

FIG. 6 is a view showing an example for implementing a propelling part of the drone having a reconfigurable shape according to an exemplary embodiment of the present invention.

FIG. 7 is another view showing an example for implementing a propelling part of the drone having a reconfigurable shape according to an exemplary embodiment of the present invention.

FIG. 8 is a view showing a cargo connected part of the unit module drone of the drone having a reconfigurable shape according to an exemplary embodiment of the present invention.

FIG. 9 is another view showing an assembly drone of the drone having a reconfigurable shape according to an exemplary embodiment of the present invention.

FIG. 10 is a view showing an example of a shape of the drone having a reconfigurable shape according to an exemplary embodiment of the present invention.

BEST MODE

Hereinafter, a drone having a reconfigurable shape according to an exemplary embodiment of the present invention having the above-mentioned characteristics will be described in more detail with reference to the accompanying drawings.

Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in the best mode.

Therefore, configurations described in exemplary embodiments and the accompanying drawings of the present invention do not represent all of the technical spirits of the present invention, but are merely most preferable embodiments. Therefore, the present invention should be construed as including all the changes, equivalents, and substitutions included in the spirit and scope of the present invention at the time of filing this application.

As shown in FIGS. 3 to 5, a drone having a reconfigurable shape according to an exemplary embodiment of the present invention may be configured of a unit module drone 100 that may be flown singly and an assembly drone 1000 that is formed by coupling unit module drones 100 to each other.

That is, the unit module drone 100 includes components required for a flight so that it may be flown singly, as shown in FIGS. 3 and 4, and the assembly drone 1000 may be formed by coupling the unit module drones 100 to each other in a desired shape when the unit module drone 100 may not be implemented singly or is used for other purposes, as shown in FIG. 5, such that the unit module drone 100 may be used as various configurations depending on a purpose and a place.

The unit module drone 100 mainly includes a body 110, a controlling part 112, propelling parts 130, and power parts 140, wherein the body 110 is formed of a frame and has a rectangular parallelepiped shape.

Particularly, the unit module drone 100 is preferably formed in a cubic shape among the rectangular parallelepiped shapes in order to configure the assembly drone 1000 by coupling the unit module drones 100 to each other, but is not limited to being formed in the cubic shape.

The controlling part 120 is configured of a control device such as a computer, or the like, and is formed at one side of an inner portion of the body 110.

The controlling part 120 controls a flight of the drone or manages an algorithm, and is preferably formed at the center of the body 110, but may also be formed on an inner side surface of the frame.

The propelling parts 130 are connected to the controlling part 120 and are formed in six directions.

That is, it is preferable that six propelling parts 130 are formed in upward and downward directions, left and right directions, and forward and backward directions, and the propelling parts 130 generate thrusts in the six directions to allow an operation (flight and take off/landing) of the unit module drone 100 to be performed.

In other words, the unit module drone 100 of the drone having a reconfigurable shape according to an exemplary embodiment of the present invention includes the propelling parts 130 generating the thrusts in all of the six directions unlike the general drone according to the related art having a propulsion device generating a thrust in one direction or two directions, such that it may horizontally move in any of the six directions. Therefore, a load mounted in the unit module drone 100 or a cargo bound to the unit module drone 100 is not inclined toward a progress direction or the center of gravity of the drone is not biased toward one side.

In addition, since the unit module drone may horizontally move in any of the six directions, it may accurately move to a desired position and a desired take off/landing place as compared with the drone according to the related art.

That is, since the unit module drone may horizontally move without requiring rotation motions such as rolling, pitching, yawing, and the like, in order to move to a direction in which the body 110 of the drone is to move unlike the drone according to the related art, the drone may be easily controlled, and may safely move due to the horizontal movement to safely transport a food, dangerous explosives, or the like, as compared with the drone according to the related art.

In addition, it preferable that the propelling parts 130 use a propeller scheme of using thrusts generated by rotation of a propeller widely used in the drone. However, since the propelling parts 130 may include a jet engine, or the like, in addition to the propeller scheme and various examples of the propelling parts 130 such as a mixture scheme of the propeller and the jet engine, or the like, are possible, the propelling parts 130 are not limited to using the propeller scheme.

The power parts 140 are formed at one side of the controlling part 120 and are formed between the controlling part 120 and the propelling parts 130 to supply power to the propelling parts 130 by a control of the controlling part 120.

Coupling parts 150, which are to couple between the unit module drones to assemble the unit module drones to each other in a desired shape, thereby forming the assembly drone 1000, are preferably formed on outer side surface of the bodies 110, particularly, outer side surfaces of the frames, in order to tightly couple between assemblies.

In the assembly drone 1000, various coupling forms such as a form in which the unit module drones are attached to each other by magnets, a form in which the unit module drones are coupled to each other by bolts, are possible, and since the coupling parts 150 may be formed of the magnets in order to attach the unit module drones 100 to each other by the magnets and the coupling parts 150 may be formed of hollow parts for screwing between bolts and nuts or previously prepared bolts in order to couple the unit module drones 100 to each other by the bolts, a kind of coupling parts 150 for coupling the unit module drones to each other is not limited, but may be variously embodied.

Here, the coupling part 150 may include a communicating part 10 including a connector, or the like, for electrical communication between the unit module drones 100.

That is, the coupling part 150 further includes the communicating part 10, such as the connector, or the like, for the electrical communication, thereby making it possible to perform the electrical communication between the unit module drones 100. Therefore, when the unit modules drones 100 are assembled to each other to thereby be formed as the assembly drone 1000, the assembly drone 1000 may be safely operated and controlled.

In addition, the communicating part 10 may not only be included in the coupling part 150 to perform wired communication, but also be provided in the body 110 to perform wireless communication between the unit module drones 100.

The communicating part 10 for electrical communication in a wireless scheme may be formed in any one or more of the body 110, the controlling part 120, and the coupling part 150. However, the communicating part is not limited thereto, but may be variously embodied.

In FIGS. 3 and 4, the case in which the communicating part 10 is provided in the body 110 is shown.

That is, it is preferable that the communicating part 10 uses a wired scheme, a wireless scheme, and a mixture scheme of the wired scheme and the wireless scheme, such that the communicating part 10 in the wired scheme may be replaced by the wireless scheme at the time of a fault or a malfunction thereof.

Since the unit module drone 100 does not have forward and backward directions and left and right directions separately determined unlike a general aircraft, but may move in the six directions, a reference of a direction axis and a position direction of the unit module drone 100 need to be set in order to be safely and accurately flown. Therefore, the unit module drone 100 according to an exemplary embodiment of the present invention may include a direction axis setting part 160 and a body direction setting part 170.

The direction axis setting part 160 uses ground contact sensors formed at one side of the body 110, and the number of ground contact sensors provided on the body 110 is one or plural.

That is, direction axes (x-y-z axes) are newly set through the ground contact sensor contacting the ground, and the unit module drone 100 or the assembly drone 1000 is flown by a control of the controlling part 120 based on the new set direction axes.

In other words, since the unit module drone 100 of the drone having a reconfigurable shape according to an exemplary embodiment of the present invention does not have a reference by movement and may horizontally move in any of the six directions, as described above, the direction axes are not set in advance, but are newly set based on a portion at which the unit module drone 100 contacts the ground, unlike an existing aircraft or drone flown based on direction axes that are set in advance, thereby making it possible to allow an operator or the controlling part 120 to easily perform a flight control on the drone.

The body direction setting part 170 sets a position direction of the body 110 using an inertial sensor formed at the other side of the body 110.

That is, since the upward and downward directions, the left and right directions, and the forward and backward directions are not set in the unit module drone 100 according to an exemplary embodiment of the present invention, information obtained from the inertial sensor and direction axis information obtained from the direction axis setting part 160 are used to allow the controlling part 120 to set to the position direction of the unit module drone 100.

That is, the body direction setting part 170 calculates which of the six directions the upward and downward directions, the forward and backward directions, and the left and right directions are, and allows the operator or the controlling part 120 to easily perform a flight control on the drone, similar to the direction axis setting part 160.

In addition, the inertial sensor of the body direction setting part 170 may be a complex sensor in which three axes (x-y-z axes) are combined with each other, and since one axis sensor may be separated, be inserted into a hexahedral frame, and be operated, a position of the inertial sensor is not limited.

The unit module drone 100 of the drone having a reconfigurable shape according to an exemplary embodiment of the present invention may further include photographing parts 180 disposed at the other side of the body 110 and including a camera for photographing.

The photographing part 180 may serve to help a controller to easily control the drone, and perform photographing for map information and information observation.

The photographing part 180 may militarily perform monitoring and reconnaissance tasks, and since one photographing part 180 may be provided or the photographing parts 180 may be provided on all of the six surfaces of the body 110 depending on a purpose, the number of photographing parts 180 is not limited.

As shown in FIGS. 5 and 6, it is preferable that the drone having a reconfigurable shape according to an exemplary embodiment of the present invention uses the propeller scheme of generating the thrusts by the rotation of the propeller, as described above.

However, in the propeller scheme, a torque corresponding to the rotation of the propeller is generated. When the torque is generated, there is a problem that the body 110 rotates in an opposite direction to a rotation direction of the propeller due to the law of action and reaction. Therefore, the torque needs to be offset in order to raise a straight moving property of the drone.

That is, an anti-torque control for offsetting the torque needs to be performed. To this end, the propelling part 130 of the drone having a reconfigurable shape according to an exemplary embodiment of the present invention may solve the above-mentioned problem using the following three examples.

<First Example of Propelling Part 130>

As shown in FIG. 6, a pair of propelling parts 130 having the same axis may be rotated reversely to each other to offset the torque.

A pair of propeller pitches having the same axis may be opposite to each other to control a thrust direction and a thrust amount. Here, the propeller pitch may be a variable pitch propeller, or the like, but is not limited thereto.

<Second Example of Propelling Part 130>

As shown in FIG. 7, the propelling part 130 may be formed of a contra-rotating propeller.

The contra-rotating propeller indicates two propellers that are disposed at an inner side and an outer side, are rotated reversely to each other, and are disposed in parallel with each other at the front and rear of each axis end.

That is, the propellers of the inner side and the outer side may be rotated in opposite directions to offset the torque, thereby increasing a straight moving property and a motion property.

<Third Example of Propelling Part 130>

In addition, as shown in FIG. 7, the propelling part 130 may include a thrust vector control device 131.

As the thrust vector control device 131, a thrust vane, or the like, may be used. This, which is a method of generating a pitching moment by changing a direction of the thrust, includes a method of controlling the thrust by changing a nozzle impact shock wave, a method of controlling the thrust by a rotating nozzle, and a method of controlling the direction of the thrust by positioning a soundboard in the nozzle.

As shown in FIG. 8, the unit module drone 100 of the drone having a reconfigurable shape according to an exemplary embodiment of the present invention may further include a cargo connected part 190 disposed at one side of the frame and connected to a cargo.

In the cargo connected part 190, various examples such as a latch type, a lifting type, and the like, are possible, and a kind of cargo connected part 190 is not limited as long as a device is a device that may be fixed to the cargo to transport the cargo.

FIG. 9 is a view showing that the assembly drone 1000 in which the unit module drones 100 are coupled to each other transports the cargo connected to the cargo connected part 190.

For example, when the unit module drone 100 has a thrust capable of transporting a weight of 1 kg, the drone having a reconfigurable shape according to an exemplary embodiment of the present invention is reconfigurable as the assembly drone 1000 in which n unit module drones 100 are coupled to each other, as shown in FIG. 9, such that it may transport a weight of 1 Kg*n. Therefore, the drone may transport a cargo that is to be transported by variously coupling the unit module drones to each other depending on a weight of the cargo.

As shown in FIG. 10, the body 110 of the unit module drone 100 according to an exemplary embodiment of the present invention is not formed of only the frame, but may be formed in a duct shape.

A duct, which is an air passage formed in a rectangular shape or a circular shape using a metal plate in order to move a fluid, may allow components to be inserted into (mounted in) the body 110 due to the metal plate constantly formed and aeromechanically improve efficiency.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the claims.

DETAILED DESCRIPTION OF MAIN ELEMENTS

1000: assembly drone
100: unit module drone

110: body
120: controlling part
130: propelling part
131: thrust vector control device
140: power part
150: coupling part
160: direction axis setting part
170: body direction setting part
180: photographing part
190: cargo connected part
10: communicating part

The invention claimed is:

1. A drone having a reconfigurable shape, comprising:
one or more unit module drones 100 each including:
    a body 110 formed of a frame and having a rectangular parallelepiped shape;
    a controlling part 120 provided in an inner portion of the body 110, formed at one side of an inner portion of the body 110 and configured to control a flight;
    propelling parts 130 connected to the controlling part 120, formed in six directions, and configured to generate thrust in each of the six directions;
    power parts 140 formed at one side of the controlling part 120 and configured to supply power to the propelling parts 130 through a control of the controlling part 120; and
    coupling parts 150 formed on outer side surfaces of the bodies 110 in order to couple between the bodies 110,
wherein the drone is configurable as an assembly drone 1000 having a shape in which the one or more unit module drones 100 are coupled to each other by the coupling parts 150, and
the propelling parts 130 are coupled to the end of the power parts 140 and are disposed at an inner portion of the body 110 not to interfere when the assembly drone 1000 is configured.

2. The drone having a reconfigurable shape of claim 1, wherein the one or more unit module drones 100 include a direction axis setting part 160 setting a direction axis using a ground contact sensor formed at one side of the body 110.

3. The drone having a reconfigurable shape of claim 1, wherein the one or more unit module drones 100 include a body direction setting part 170 setting a position direction of the body 110 using an inertial sensor formed at the other side of the body 110.

4. The drone having a reconfigurable shape of claim 1, wherein the one or more unit module drones 100 further include communicating parts 10 formed in any one or more of the body 110, the controlling part 120, and the coupling part 150 and formed for electrical communication between the one or more unit module drones 100.

5. The drone having a reconfigurable shape of claim 1, wherein the propelling parts 130 use a propeller scheme.

6. The drone having a reconfigurable shape of claim 5, wherein in the propelling parts 130, propeller pitches of a pair of propelling parts 130 having the same axis are opposite to each other.

7. The drone having a reconfigurable shape of claim 5, wherein the propelling parts 130 are a contra-rotating propeller.

8. The drone having a reconfigurable shape of claim 5, wherein the propelling parts 130 include a thrust vector control device 131.

9. The drone having a reconfigurable shape of claim 1, wherein the one or more unit module drones 100 further include a cargo connected part 190 disposed at one side of the frame and connected to a cargo.

10. The drone having a reconfigurable shape of claim 1, wherein the one or more unit module drones 100 further include photographing parts 180 disposed at the body 110 and including a camera for photographing.

11. The drone having a reconfigurable shape of claim 1, wherein the body 110 is formed in a duct shape.

12. An assembly drone comprising:
one or more unit module drones, each drone comprising:
    a body having a parallelepiped shape;
    a controlling part formed at one side of an inner portion of the body and configured to control a flight;
    at least six propelling parts connected to the controlling part and each configured to generate thrust in one of six directions;
    power parts formed at one side of the controlling part and configured to supply power to each of the at least six propelling parts under control of the controlling part; and
    coupling parts formed on outer side surfaces of the body in order to couple with another unit module drone,
wherein the assembly drone has a shape in which the one or more unit module drones are coupled to each other by the coupling parts.

13. The assembly drone of claim 12, wherein the coupling parts comprise magnets.

14. The assembly drone of claim 12, wherein the coupling parts comprise bolts and nuts.

15. The assembly drone of claim 12, wherein at least one of the coupling parts comprises a connector configured to provide electrical communication with another unit module drone.

16. The assembly drone of claim 12, further comprising another unit module drone of the one or more unit module drones, the another unit module drone physically coupled with the one or more unit module drones.

17. The assembly drone of claim 16, wherein the another unit module drone is physically coupled with the one or more unit module drones by a magnetic coupling part.

18. The assembly drone of claim 16, wherein the another unit module drone is physically coupled with the one or more unit module drones by a bolt and nut.

19. The assembly drone of claim 12, wherein the at least six propelling parts are positioned interior to the outer side surfaces of the body.

* * * * *